Figure 6:
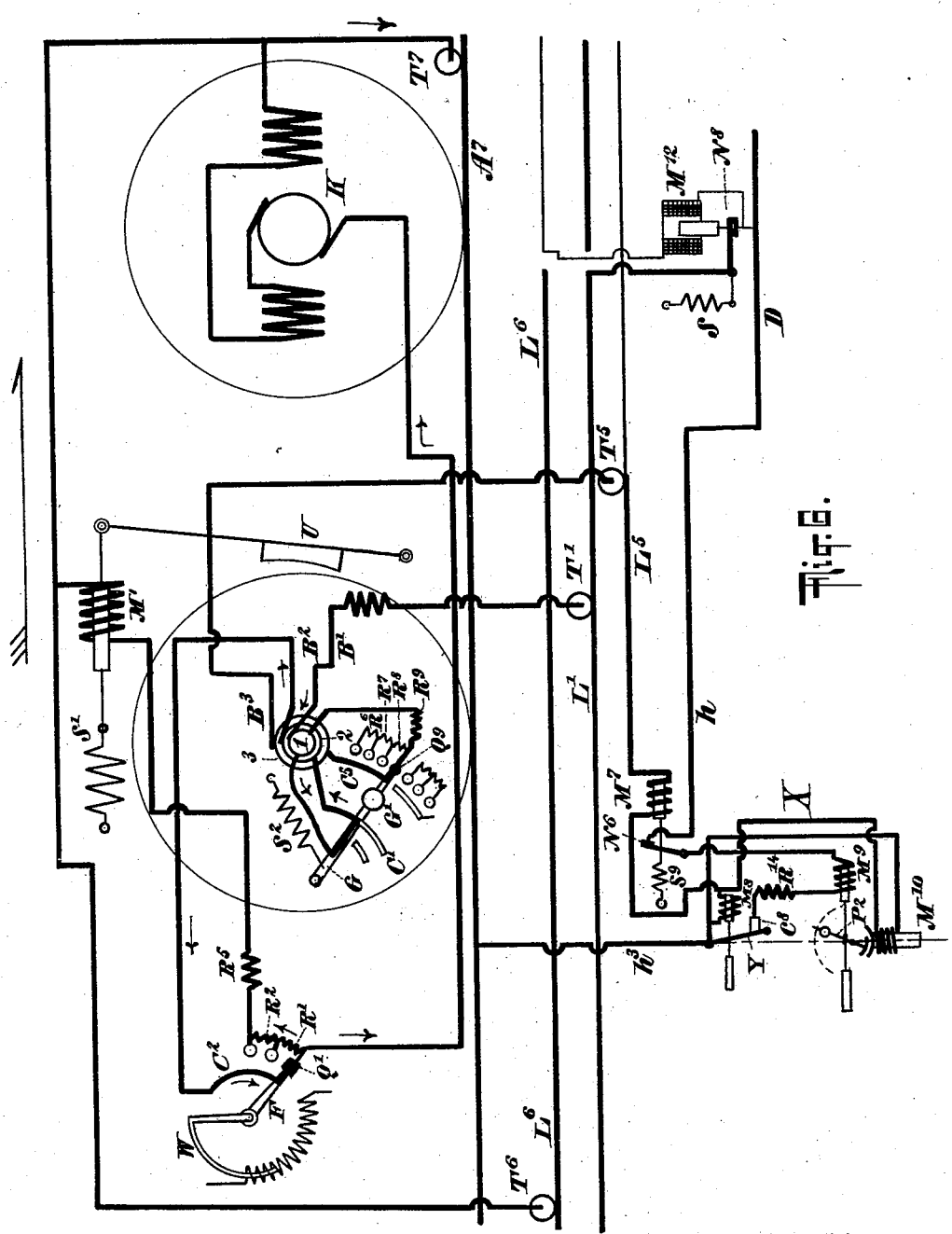

No. 720,273. PATENTED FEB. 10, 1903.
T. E. MURRAY & J. VAN VLECK.
ELECTRIC RAILWAY.
APPLICATION FILED NOV. 22, 1901.
NO MODEL. 10 SHEETS—SHEET 1.
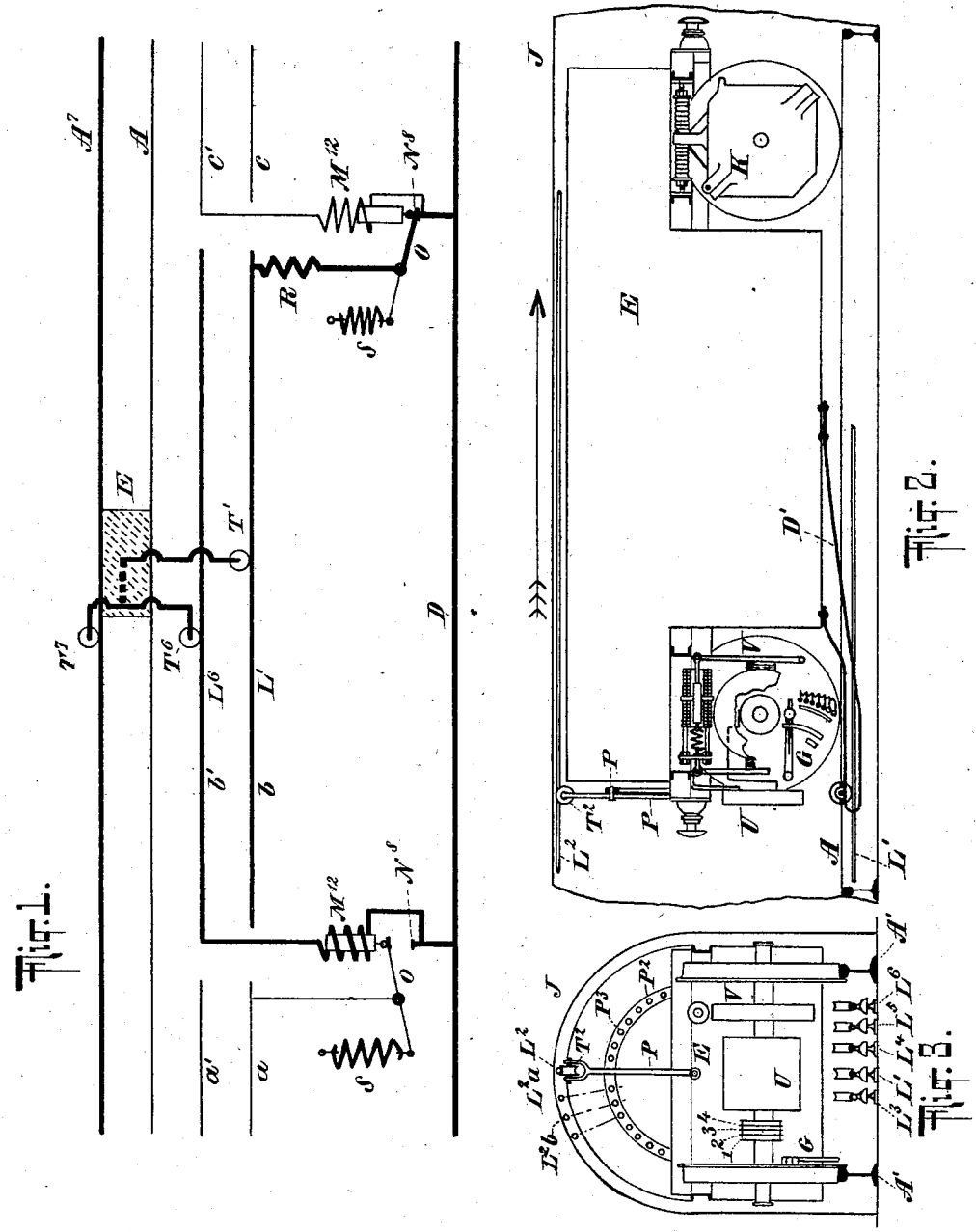
WITNESSES:
Edwin H. Dietrich
H. R. Hotter
INVENTORS
Thomas E. Murray
John Van Vleck
BY
ATTORNEY No. 720,273. PATENTED FEB. 10, 1903.
T. E. MURRAY & J. VAN VLECK.
ELECTRIC RAILWAY.
APPLICATION FILED NOV. 22, 1901.
NO MODEL. 10 SHEETS—SHEET 2.
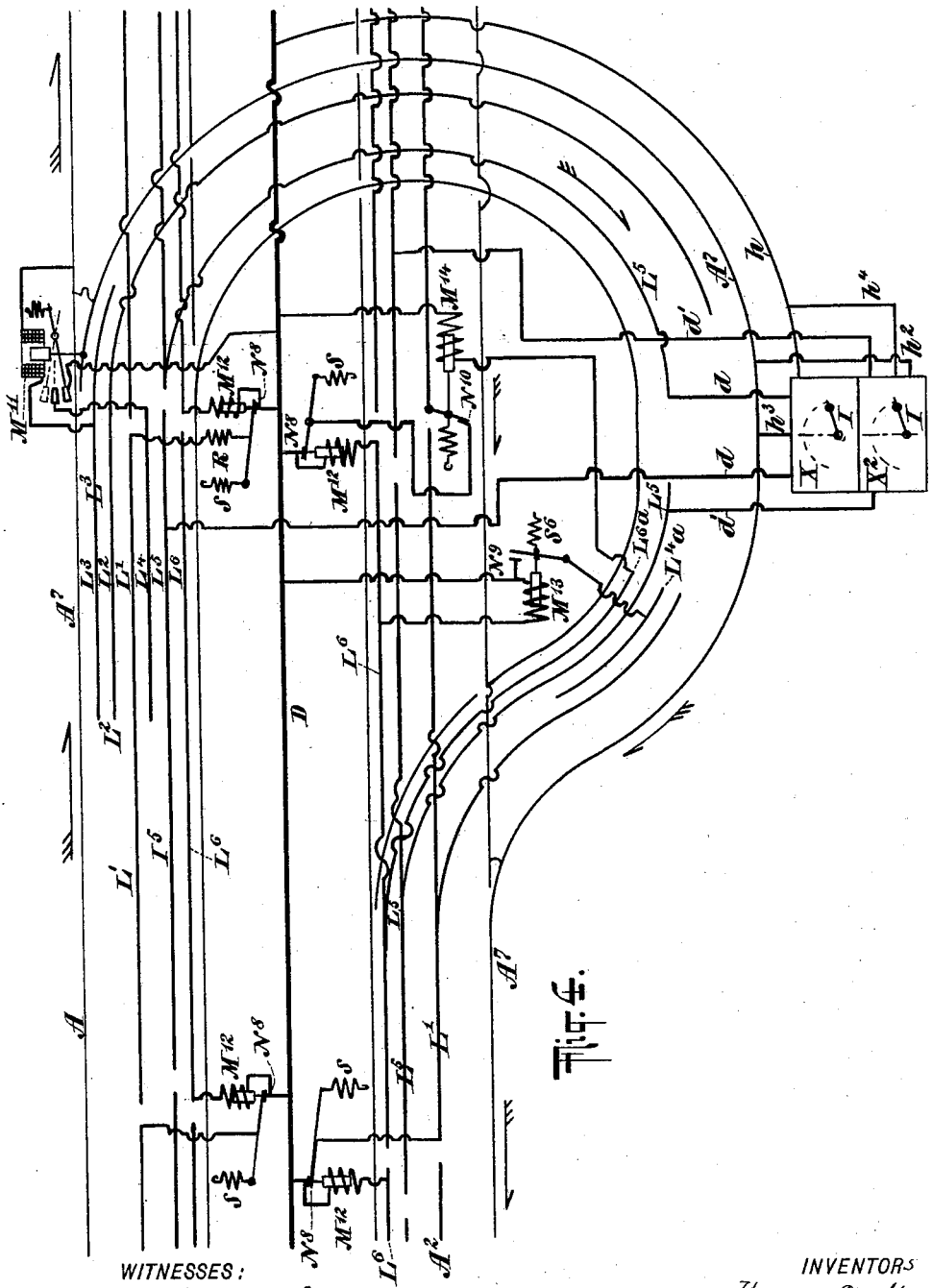
WITNESSES:
INVENTORS
Thomas E. Murray
John Van Vleck
BY
their ATTORNEY No. 720,273. PATENTED FEB. 10, 1903.
T. E. MURRAY & J. VAN VLECK.
ELECTRIC RAILWAY.
APPLICATION FILED NOV. 22, 1901.
NO MODEL. 10 SHEETS—SHEET 3.
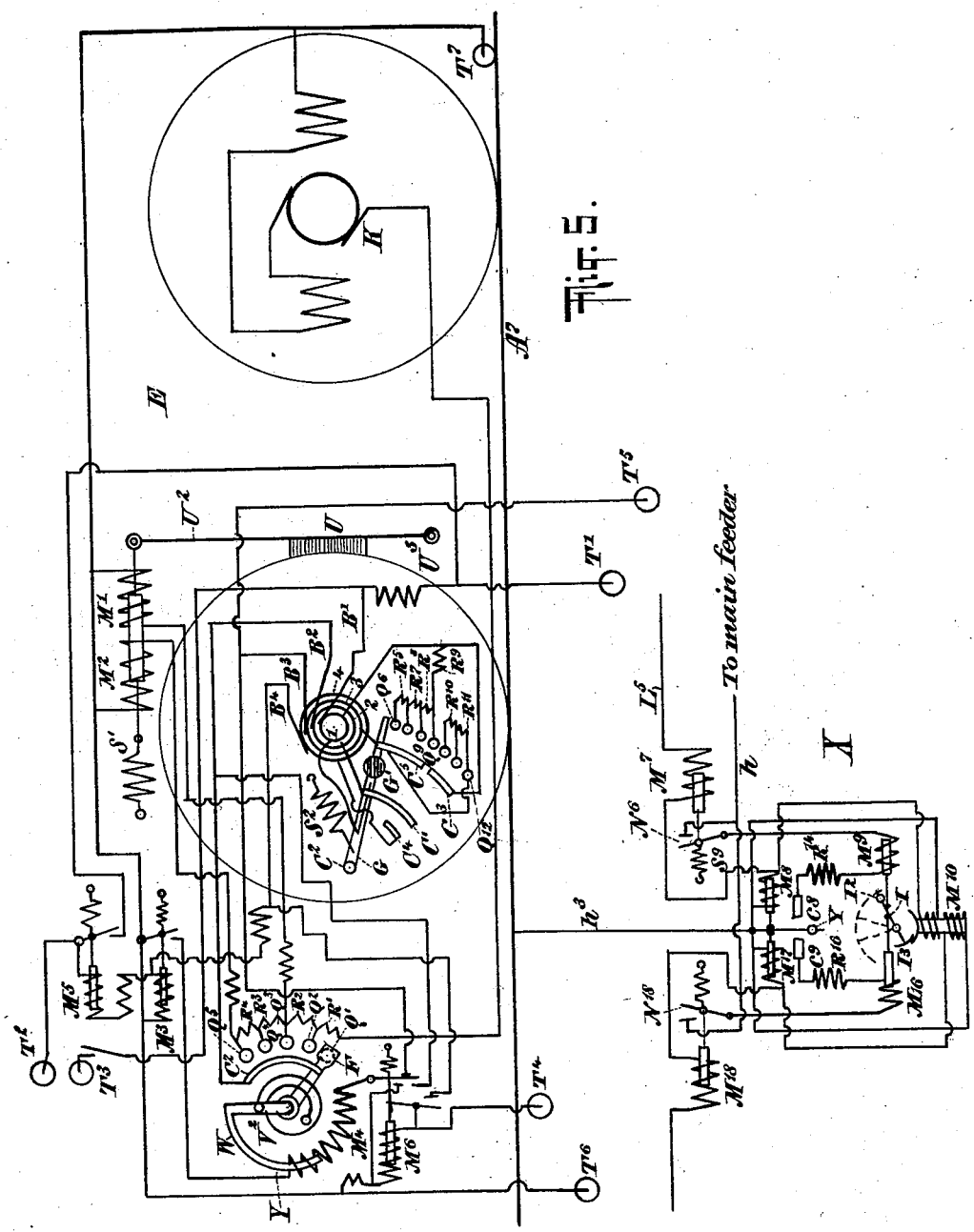
WITNESSES:
INVENTORS
Thomas E. Murray
John Van Vleck
BY
ATTORNEY No. 720,273. PATENTED FEB. 10, 1903.
T. E. MURRAY & J. VAN VLECK.
ELECTRIC RAILWAY.
APPLICATION FILED NOV. 22, 1901.
NO MODEL. 10 SHEETS—SHEET 4.

WITNESSES:
INVENTORS
Thomas E. Murray
John Van Vleck
BY
their ATTORNEY

No. 720,273. PATENTED FEB. 10, 1903.
T. E. MURRAY & J. VAN VLECK.
ELECTRIC RAILWAY.
APPLICATION FILED NOV. 22, 1901.
NO MODEL. 10 SHEETS—SHEET 5.
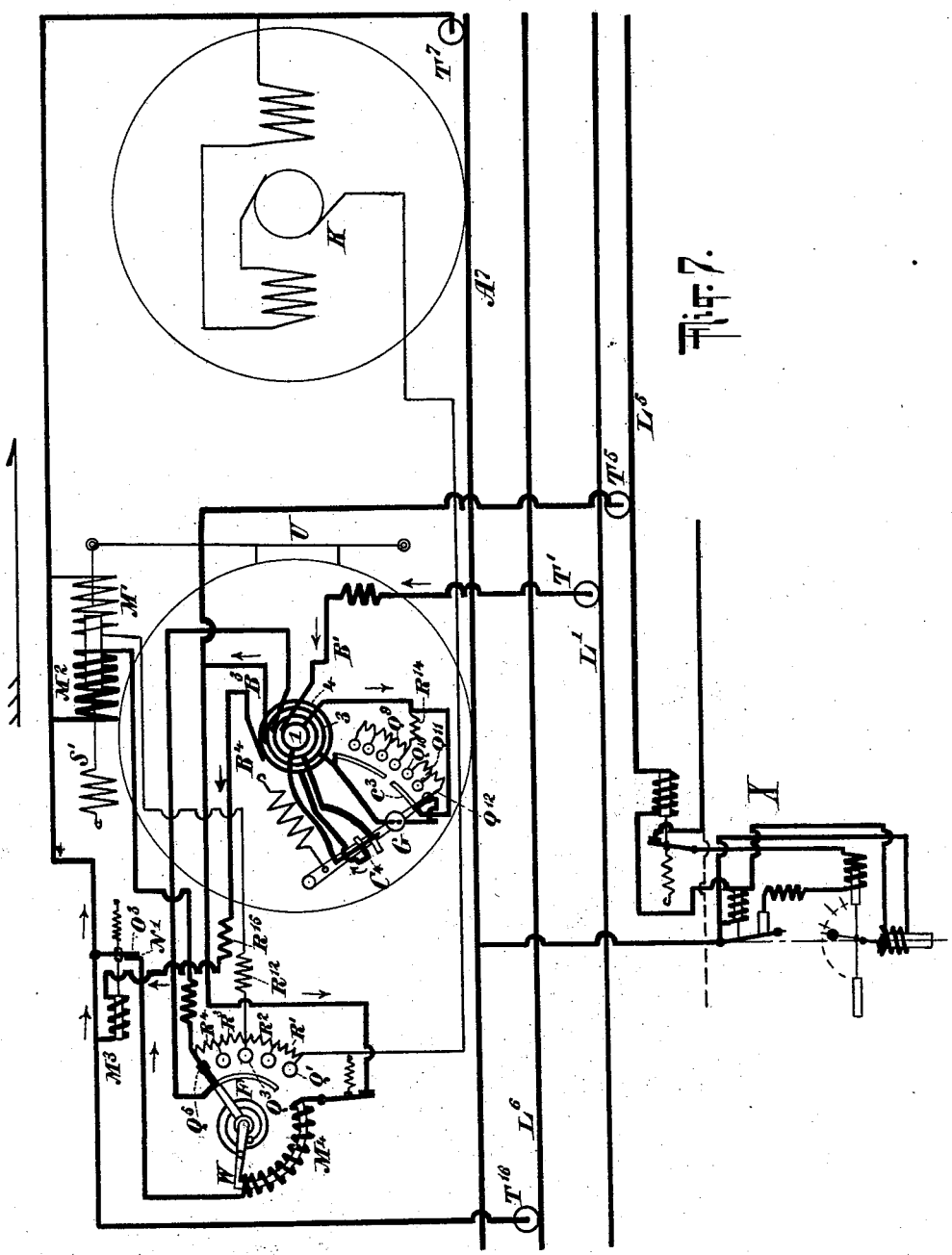
WITNESSES:
INVENTORS
Thomas E. Murray
John Van Vleck
BY
ATTORNEY No. 720,273. PATENTED FEB. 10, 1903.
T. E. MURRAY & J. VAN VLECK.
ELECTRIC RAILWAY.
APPLICATION FILED NOV. 22, 1901.
NO MODEL. 10 SHEETS—SHEET 6.
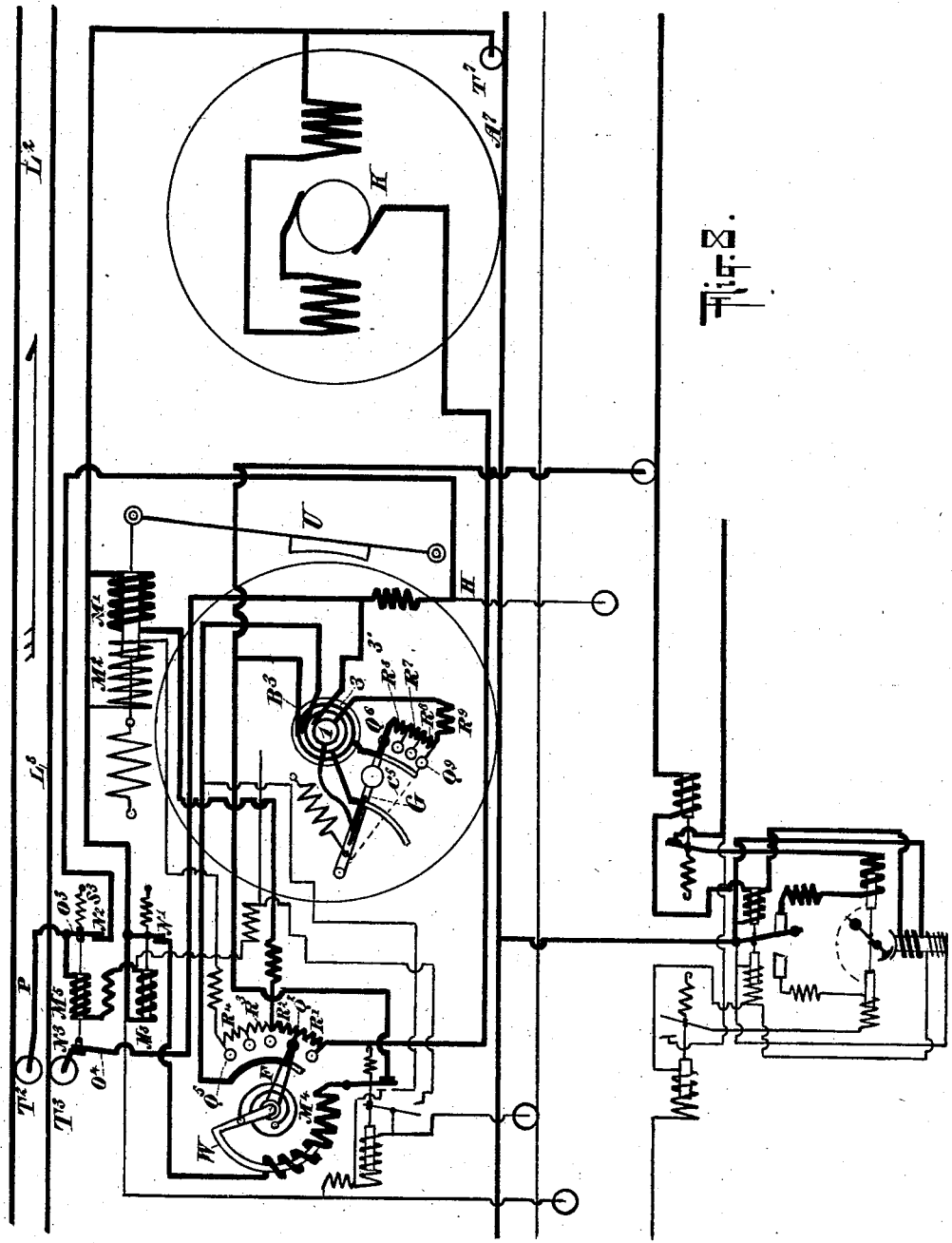
WITNESSES:
INVENTORS
Thomas E. Murray
John Van Vleck
BY
ATTORNEY No. 720,273. PATENTED FEB. 10, 1903.
T. E. MURRAY & J. VAN VLECK.
ELECTRIC RAILWAY.
APPLICATION FILED NOV. 22, 1901.
NO MODEL. 10 SHEETS—SHEET 7.
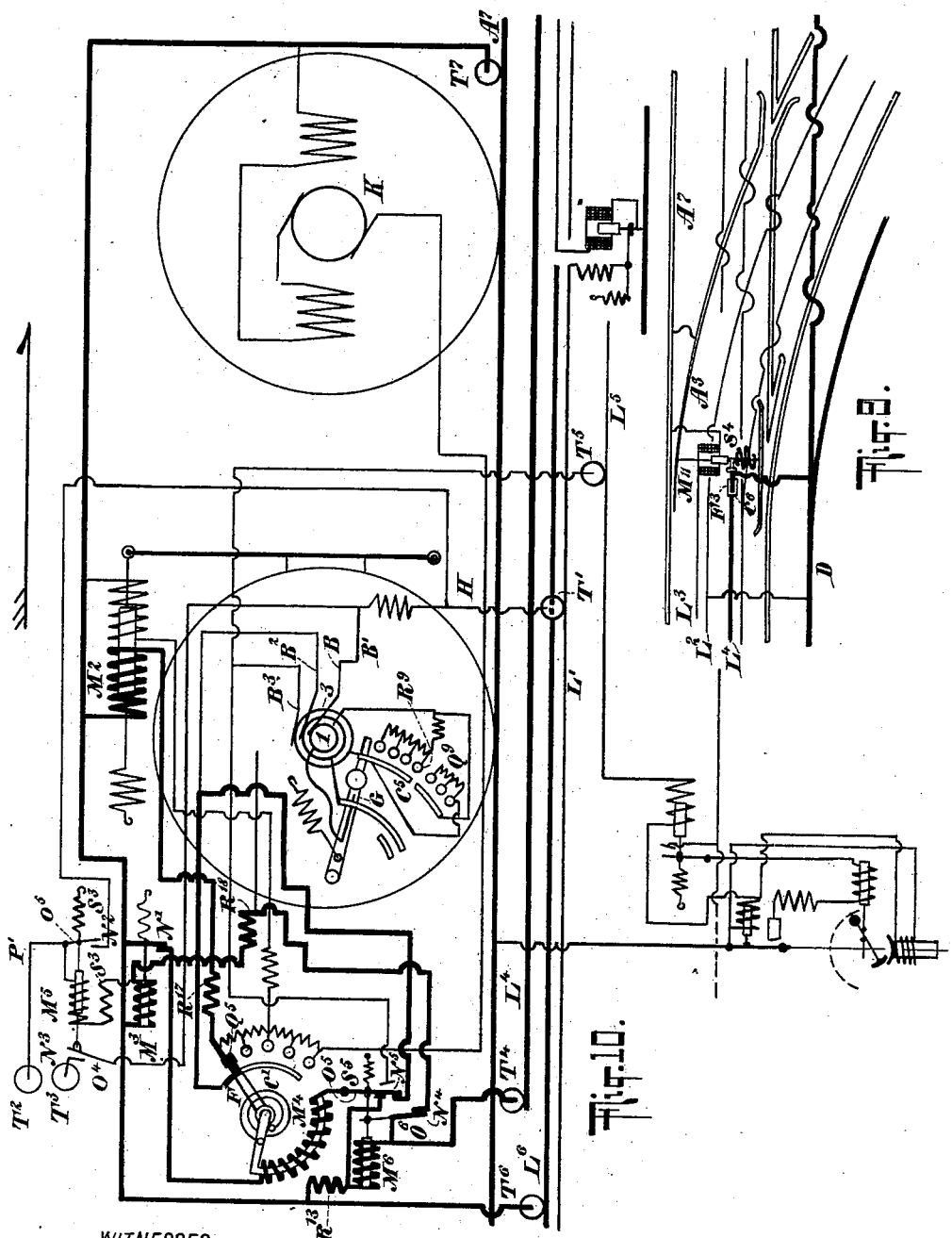
WITNESSES:
INVENTORS
Thomas E. Murray
John Van Vleck
BY
their ATTORNEY

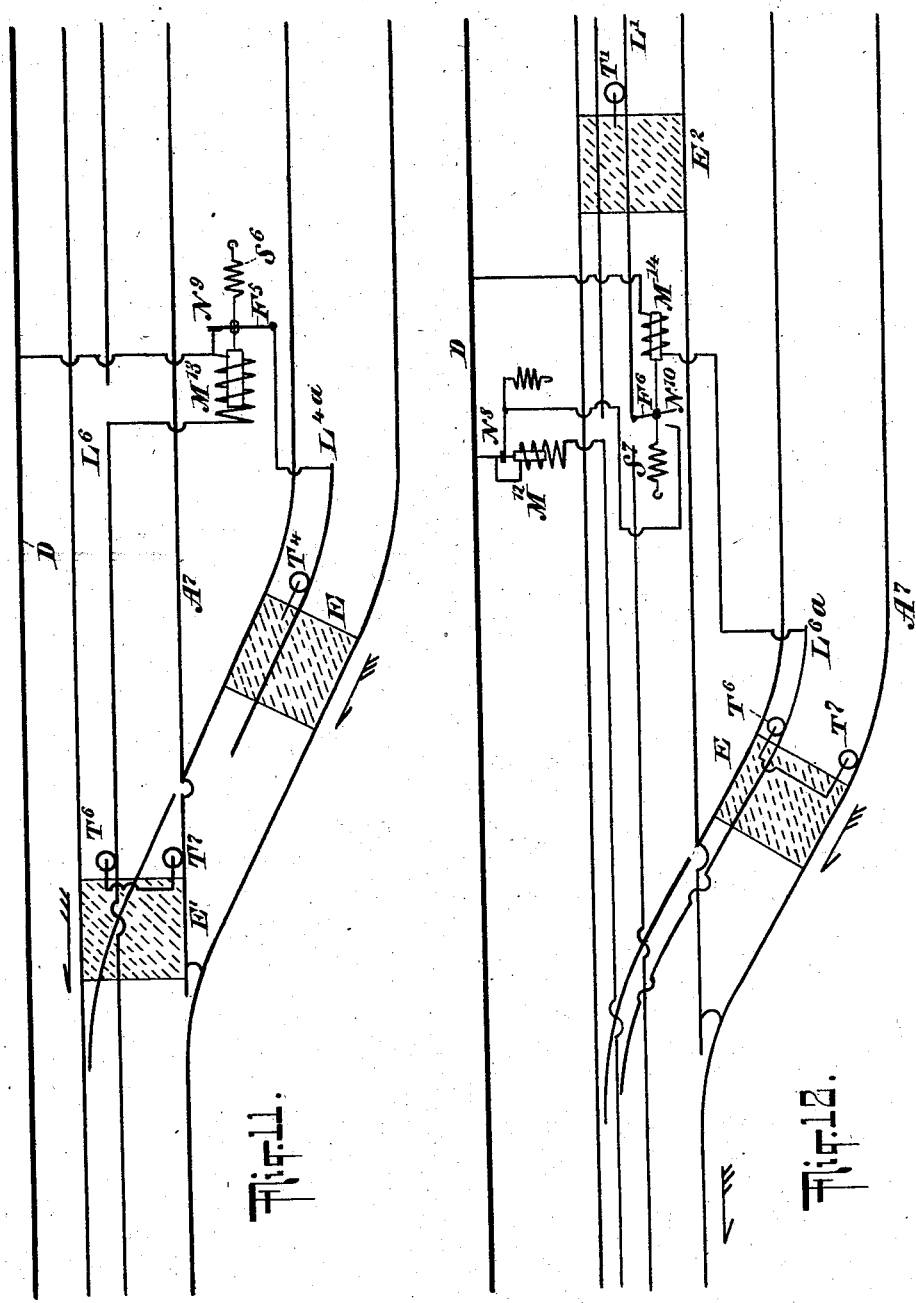

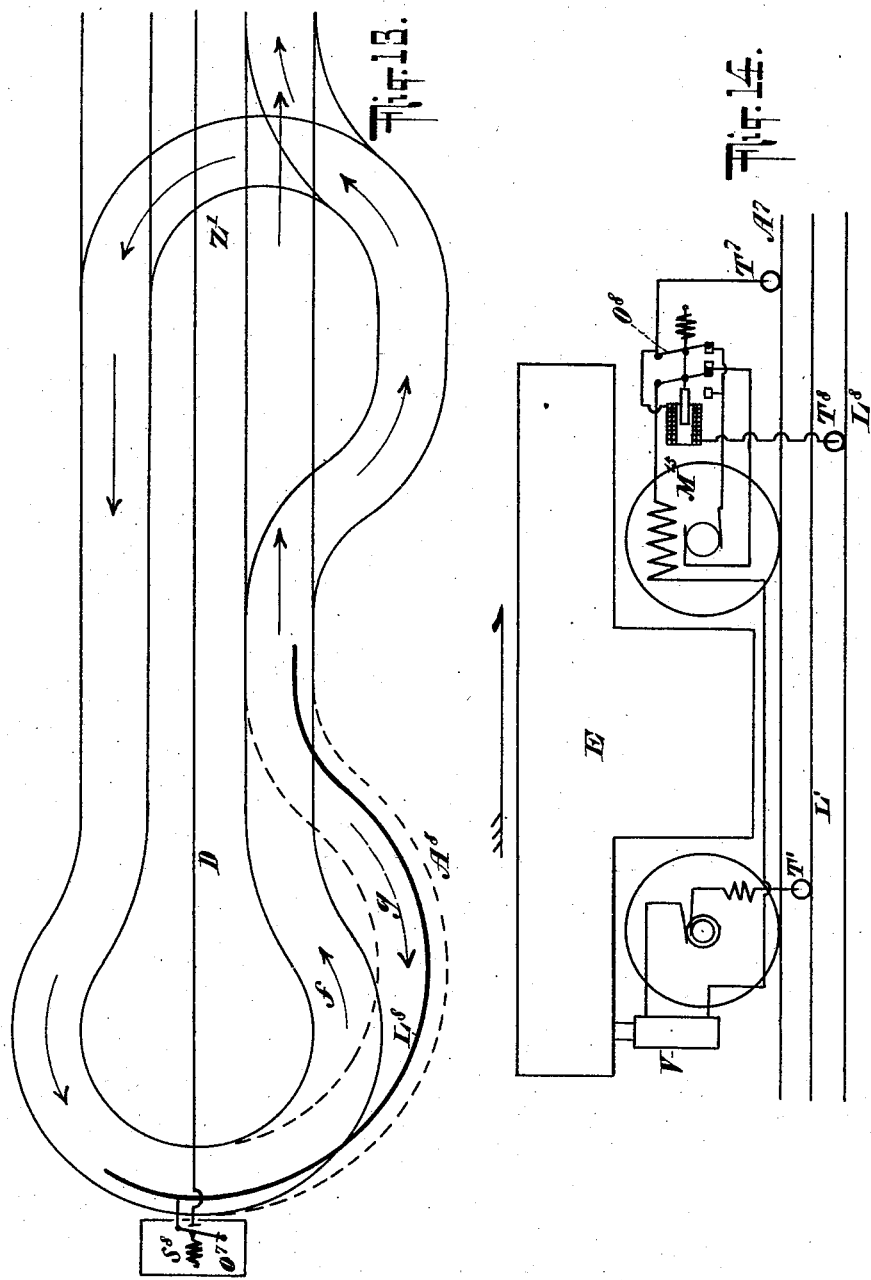

No. 720,273. PATENTED FEB. 10, 1903.
T. E. MURRAY & J. VAN VLECK.
ELECTRIC RAILWAY.
APPLICATION FILED NOV. 22, 1901.
NO MODEL. 10 SHEETS—SHEET 10.
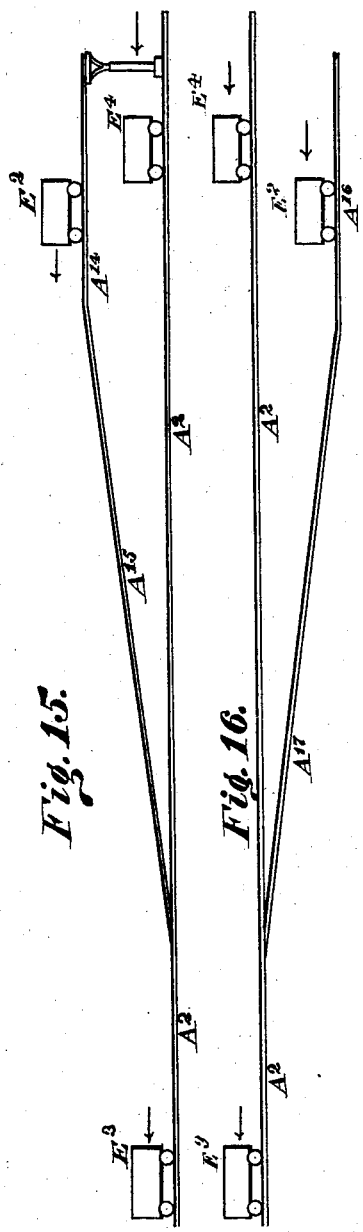
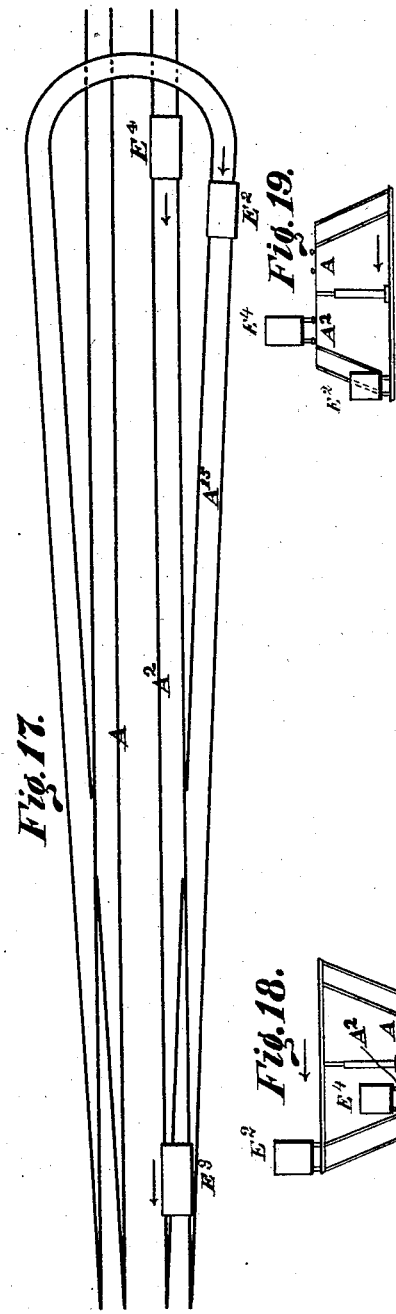
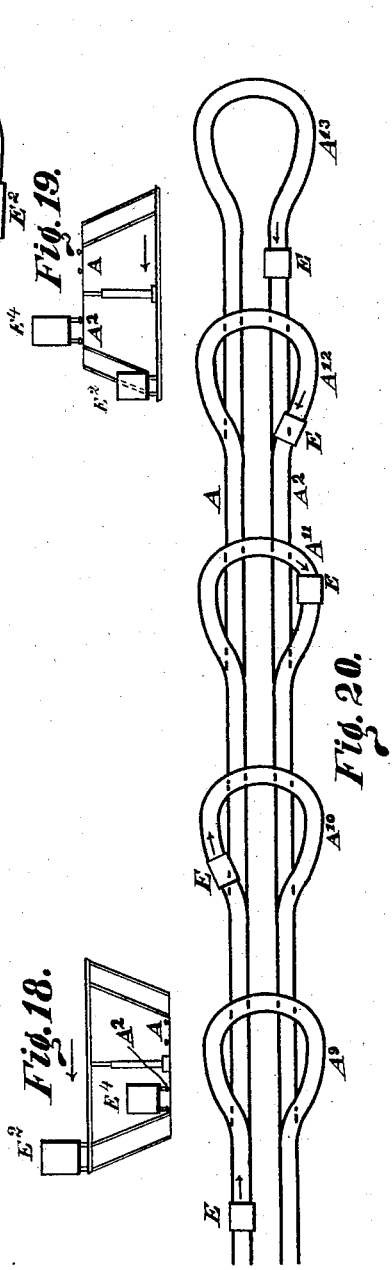

UNITED STATES PATENT OFFICE.

THOMAS E. MURRAY AND JOHN VAN VLECK, OF NEW YORK, N. Y.

ELECTRIC RAILWAY.

SPECIFICATION forming part of Letters Patent No. 720,273, dated February 10, 1903.

Application filed November 22, 1901. Serial No. 83,318. (No model.)

*To all whom it may concern:*

Be it known that we, THOMAS E. MURRAY and JOHN VAN VLECK, of the city, county, and State of New York, have invented a new and useful Improvement in Electric Railways, of which the following is a specification.

The object of our invention is to provide an electric railway for the conveyance of parcels, mail, and other matter in which the cars shall be operated automatically.

Our invention consists in an electric railway having a track and stations disposed at intervals along the same and also cars electrically propelled on said track. The construction and arrangement is such that, first, a car starting from a principal depot or any given station will automatically proceed to and stop at any other given station; second, prior to reaching the predetermined station said car will automatically close a switch for leading it upon the station-siding; third, prior to reaching the predetermined station the strength of the current actuating said car will be automatically reduced; fourth, prior to reaching the predetermined station an electric brake mechanism will be automatically applied to retard the motion of the car; fifth, the line conductors in proximity to the track are disposed in block-sections, and by means of suitable automatic mechanism the section next to and immediately succeeding that upon which the car is advancing is rendered dead, so protecting the car from rear collisions; sixth, the car mechanism being adjusted for a predetermined or normal speed any excess speed will result in the automatic operating of mechanism to reduce said speed to normal; seventh, in event of the automatic switch-controlling mechanism not properly setting the switch the car is automatically arrested before the switch is reached and cannot proceed until the failure is corrected; eighth, the track is double and stations are located on loops extending from one track to the other, but in a different plane—that is to say, the loop may preferably rise over the tracks or descend below them—the stations are located on said loops; ninth, in case a car passing from a loop to main track comes in danger of rear collision with a car on said main track said first-named car is automatically stopped; tenth, in case a car on main track comes in danger of rear collision with a car coming to main track from a loop said first-named car is automatically stopped; eleventh, a reversing-gear is provided on each car, whereby from a distant point the motion of said car may be reversed; twelfth, an indicating mechanism is provided located at stations, whereby the speed of cars in proximity to the station is indicated and also their position at one side or the other of said station; thirteenth, a continuous sheet-steel hood may be provided when the tracks are above ground to protect the track, cars, and conductors and prevent derailment.

Our invention includes, broadly, the means and instrumentalities whereby the foregoing results are achieved, all as more particularly hereinafter set forth, and pointed out in the claims.

In the accompanying drawings the various parts and combinations, together with the electrical mechanisms and connections, are shown symbolically. In each figure representing electrical circuits and connections live connections through which currents are passing under the described conditions are indicated by thick lines.

In the accompanying drawings, Figure 1 is an electrical diagram, in which the car E is also represented symbolically, illustrating the arrangement of the block-sections and associated mechanism. Fig. 2 is a side elevation of the car, track, and certain mechanism of the car and protecting-hood. Fig. 3 is an end view of the car and hood. Fig. 4 is an electrical diagram showing the general arrangement of tracks, station-loops, indicating mechanism, and various lines adjacent to a station. Fig. 5 is an electrical diagram showing the relation and position of the various mechanisms and connections with the car at rest on its track. Fig. 6 is an electrical diagram showing the relation of parts, mechanism, and connections with the car running at normal speed on the main trolley-line. Fig. 7 is an electrical diagram showing the car running at excessively high speed on the main trolley-line and being automatically checked by the centrifugal governor G. Fig. 8 is an electrical diagram showing the position of parts and mechanism when the car is reduced in speed and runs upon a station-loop. Fig. 9 is a plan view of the switch and its associated controlling mechanism under the conditions just stated. Fig. 10 is an electrical diagram showing the car running on the main trolley-line, the parts and electrical mechanism being in the position when the turnout-switch has failed to open fully and the car is then being automatically brought to rest. Fig. 11 is a plan view showing the track connections and the cars under the condition when there is danger of rear collision of the car running from the loop with the car already upon the main track. Fig. 12 represents similar conditions when the car coming from the loop is in danger of being run into by the car on the main track. Fig. 13 is a plan view of the track, additional siding, and the means for reversing the motion of the car, whereby the car is caused to return on said additional siding. Fig. 14 is a side elevation showing diagrammatically the reversing-gear on the car and the line conductors with which it connects. Fig. 15 is a diagram showing the main tracks and loop tracks in side elevation, the loop tracks being in a different plane from that of the main tracks and rising above said main tracks. Fig. 16 is a diagram showing the main tracks and loop tracks in side elevation, the loop tracks being in a different plane from that of the main tracks and descending below said main tracks. Fig. 17 is a plan view of the loop and main tracks shown in either Fig. 15 or Fig. 16. Fig. 18 is a diagram showing the main tracks and loops of Fig. 15 in end elevation, the view being taken from the right-hand side of the drawing. Fig. 19 is a diagram showing the main tracks and loops of Fig. 16 in end elevation, the view being taken from the right-hand side of the drawing. Fig. 20 is a plan view of the main tracks, showing a plurality of loops disposed at intervals along said tracks together with the car indicated in different positions on said loops. In Figs. 15 to 20, inclusive, all electrical connections are omitted for the sake of clearness, the object of these figures being merely to show the disposition of the main and loop tracks.

Similar letters and numbers of reference indicate like parts.

The system includes—

First. A double track A A$^2$, a rail A$^7$ of which serves as the return-conductor and is traversed by a return-trolley T$^7$ on the car.

Second. A main feeder-line D, which extends alongside the track.

Third. A main trolley-line L', from which current is taken by a trolley T' on the car to the motor. This line extends parallel to the track and is divided into block-sections.

Fourth. A breaker-line L$^6$. This line is in sections corresponding to those of L' and extends parallel to the tracks. It is traversed by a trolley T$^6$ on the car. Its function is, in connection with suitable devices to be described, to render dead the block-section of L', which immediately follows the block-section on which the car is traveling.

Fifth. A station-line L$^2$. This is a short section of line extending parallel to the tracks and for a certain distance in advance of each station. When encountered and traversed by a trolley T$^2$ on the car, its function is, through suitable devices to be described, to supply current to operate the motor and run the car to the station at a reduced rate of speed.

Sixth. A switch-line L$^3$. This is a short section of line parallel to the tracks and disposed in advance of each of the turnout-switches which divert the car from the main line to a station. When encountered and traversed by a trolley T$^3$ on the car, its function is, in connection with station-line L$^2$ and suitable devices to be described, to close the switch in advance of the car.

Seventh. A safety-line L$^4$. This is a short section of line parallel to the tracks and disposed in advance of each switch. When encountered and traversed by a trolley T$^4$ and in connection with suitable devices to be described, its function is to cut off current to the car-motor and apply the brakes in case the switch should fail to be properly opened or closed.

Eighth. An indicator-line L$^5$. This line extends parallel with the tracks. It is traversed by a trolley T$^5$ on the car and, in connection with suitable devices to be described, its function is to operate indicating mechanism at the stations to show whether a car is running or at rest and also the speed and block location of the car.

It will thus be seen that there are in addition to the rails and main feeder-line six other lines L', L$^2$, L$^3$, L$^4$, L$^5$, and L$^6$, with each of which a separate trolley T' T$^2$ T$^3$ T$^4$ T$^5$ T$^6$ on the car makes contact.

The car E may be of any suitable construction provided with the usual trucks running on the rails and with any suitable electric motor mechanism, (represented symbolically at K.) In addition and coöperating with the line system it carries four principal devices with the necessary associated electric and mechanical connections—namely: first, an automatic brake mechanism U; second, a controller V, whereby the current actuating the motor and the brake is controlled; third, a centrifugal governor G, constructed and operating to regulate the strength of the current proceeding to the controller in accordance with the speed of rotation of a car-truck; fourth, a directing-arm P, carrying the trolley T$^2$, whereby contact is made with the station-line L$^2$.

There is located at each station—

First. A turnout-loop. This is a track-section connecting by a switch from one track preferably rising up and over the other track and finally descending to join the last-named track. The station is preferably situated on a straight portion of the loop, which is parallel to and over the return-track.

Second. A station-line $L^2$, located in a definite position peculiar to that station, and hence in a different position at each station, and requiring, therefore, that the directing-arm P, carrying the trolley $T^2$, shall be set in some predetermined position in order that said trolley may make contact with said line on reaching it. This is the selective device whereby a car having its directing-arm P set in definite position will be automatically switched off upon the loop only of that station which has its line $L^2$ placed to receive the arm P when thus set, or, to put it in another way, it may be imagined that if arm P is set at a certain angle its trolley $T^2$ will meet only line $L^2$ of station 1, if set at a certain greater angle only line $L^2$ of station 2, and so on, the station at which the car will be switched off from the main line being therefore determined by the position given to the directing-arm P.

Third. A switch mechanism and electric controlling devices so constructed and arranged as that when car-trolley $T^3$ makes contact with the short switch-line $L^3$, located in advance of said station, said switch will be closed to permit the car to run upon the loop, and when said trolley $T^3$ runs off said line $L^3$ then said switch will be automatically opened.

Fourth. A safety mechanism and electric controlling devices so constructed and arranged that when the switch is not properly closed or opened then through the contact of trolley $T^4$ with the short safety-line $L^4$, located in advance of said station, suitable mechanism is operated to cut off current from the motor and apply the brakes.

Fifth. Branch lines from $L^6$ and $L^4$ and associated electric mechanism, whereby a car coming from the station-loop to the main track is prevented from running into a car on said main track by being held at rest until the last-named car has left the block on which it is running; also, so that a car running on the main track will be prevented from overtaking a car coming upon said main track from said station-loop by being retarded or stopped until said last-named car has left the main-track block upon which it enters.

Sixth. An indicating mechanism X, located at the station and associated with line $L^5$ and trolley $T^5$ on the car for giving the information already noted in referring to said line and trolley.

*The main trolley-line and block system.*— This is illustrated by electrical diagram in Fig. 1. Three block-sections $a$ $b$ $c$ of the main line $L'$ and $a'$ $b'$ $c'$ of the breaker-line $L^6$ are indicated. The car E is located on block $b$ and has a trolley $T^7$ in contact with the return-rail $A^7$ and trolleys $T'$ and $T^6$, both connected to said return-trolley and respectively in contact with lines $L'$ and $L^6$. As will be hereinafter explained, current from $L'$ has to pass through controlling and operating mechanism on the car before reaching $T^7$, whereas $L^6$ is directly connected to trolleys $T^6$ and $T^7$ to return $A^7$, so as to allow current to flow directly from $T^6$ to $T^7$. Each block-section is connected at one end to the main feeder-line D through a circuit-breaking lever O, which by the action of spring S, attached to it, normally closes contact with the feeder at $N^8$, as shown at the right of Fig. 1, so that current proceeds from said feeder to section $b$ of line $L'$, trolley $T'$, return-trolley $T^7$, and return-rail $A^7$. Each corresponding parallel section of the breaker-line $L^6$ is also connected to the main feeder-line D through the coil of a solenoid $M^{12}$, and the core of said solenoid is connected to lever O. Consequently when circuit is made from feeder D to breaker-line $L^6$ to trolley $T^6$ and return-trolley $T^7$ and rail $A^7$ the solenoid $M^{12}$, as shown on the left of Fig. 1, attracts circuit-breaking lever O and opens contact $N^8$, so that circuit is broken from feeder D to section $a$ of line $L'$. Thus the current which passes over a given block-section of $L'$, as $b$, both actuates the motor and opens the switch, which connects the feeder to the next following block-section $a$, so that the car in moving over the line is always succeeded by a dead block-section, upon which, of course, no following car can pass.

*Special block section.*—It is often desirable that a car in approaching a station or other stopping-point shall slow down. This we effect by interposing a suitable resistance R, Fig. 1, in the branch leading from switch-lever O to the block-section upon which it is desired speed shall be diminished. Thus, as shown on the right of Fig. 1, by reason of the presence of the resistance R less current would pass upon section $b$ than upon section $a$ of line $L'$. We term a section provided with such a resistance, for the purpose stated, a "special block-section."

*The general arrangement of car and hood.*— This is illustrated in Figs. 2 and 3. The hood J is of sheet-steel of cross-section conforming to that of the car E. It extends throughout the entire road and has the rails and various lines L to $L^6$ disposed within it. As represented in Fig. 3, all of the lines, excepting the station-lines $L^2$, are laid on the road-bed between the rails; but this is not essential, as they can of course be placed wherever convenient. The station-line $L^2$ is placed on the intrados of the arch, which is a semicircle struck from the pivot-point of directing-arm P (on the car) as a center, so that the trolley $T^2$ on said arm may make contact with said line, no matter where around the semicircle the line may be placed. Thus in Fig. 3 the trolley $T^2$ is shown in contact with the line $L^2$, placed at the summit of the arch, so that the arm P is vertical. This would be the position of the line $L^2$ for one station, and the arm P would then make contact with it only when vertical. For another station the line $L^2$ might be in the position of $L^{2a}$, in which case, if it were desired that the car should be switched off at that station, the arm P would be suitably inclined. At a third station the position of line $L^2$ might be as shown at $L^{2b}$, and then the arm P would be still further inclined. In order to adjust the arm P to meet the line $L^2$ of any desired station, we provide the semicircular guide-bar $P^2$ on the car, on which are openings $P^3$, corresponding in position to all of the station-lines and suitably marked. The arm P may be adjusted over any opening $P^3$ and there held by a pin entering said opening, as shown in Fig. 2, or any other suitable means may be employed for holding said arm in position. The arm is electrically connected with the mechanism which the lines $L^2$ are intended to control, as will be hereinafter more fully explained. Before the car is started, therefore, the arm P is adjusted upon opening $P^3$, which corresponds in position to that of the line $L^2$ of the station at which it is desired the car shall be automatically switched upon the loop-line there located. Afterward the trolley $T^2$ cannot make contact with any station-line $L^2$ except the one for which the adjusted position of arm P adapts it, and when it does make such contact then the car is switched off at the predetermined station. As shown in Fig. 2, the motor K is arranged to actuate the car-wheels at one end of the vehicle, and at the other end one wheel carries on its inner side the centrifugal governor G. The automatic brake U and its mechanism are supported from the car-frame in any suitable manner, and so also is the controller V. The series of contact-rings 1 2 3 4 are disposed on the car-axle and suitably insulated and electrically connected, as hereinafter explained. The arrow in Fig. 2 indicates the direction of movement of the car. The trolley T is journaled in the upper side of the doubled bar D', which bar is secured to the under side of the car-body. In passing over switches the lower side of the bar D' meets the rails and so lifts the trolley T' clear of the junction and prevents injury to it.

*The general arrangement of turnout loop and lines at a station.*—This is shown diagrammatically and in plan in Fig. 4. The main feeder-line D is represented between the tracks; but it may be in any convenient position. Of the various circuit-breakers represented in Fig. 4 those having the solenoid $M^{12}$ and contact $N^8$ and spring S have already been described in connection with Fig. 1. Three others remain, of generally similar construction. That having the solenoid $M^{11}$ and associated parts operates the track-switch whereby the car is shunted to the station-loop; that having the solenoid $M^{13}$ and associated parts controls the devices for preventing a car coming from the loop from running into a car on the main track, and that having the solenoid $M^{14}$ and associated parts controls the devices for preventing a car on the main track from overtaking a car entering the main track from the branch track. Two indicating mechanisms $X X^2$ are shown, one for each track, and these, as already stated, show the speed of the car and the side of the station on which the car is running. The car is supposed to travel on the tracks in the direction of the arrows in Fig. 4. For convenience, hereinafter the track from which the car passes upon the loop is termed the "uptrack" and the other track the "downtrack." The block-section of L' on the uptrack immediately preceding the switch leading to the loop contains resistance R, and hence is a special block-section.

*The brake, governor, and controlling mechanism of the car.*—These parts can best be described with reference to Fig. 5, which shows all diagrammatically. The car is here at rest. The wheels and return-trolley $A^7$ are of course on the rails, but none of the trolleys meet any of the various lines. The brake-shoe U is mounted on an arm $U^2$, pivoted at $U^3$. The upper end of arm $U^2$ is connected to the core of the antagonistic solenoid-coils $M^2$ and M', and said core is connected to one end of a spring S'. Spring S' normally tends to hold the brake-shoe against the wheel-rim. Solenoid M' when energized, acting against the spring, withdraws said shoe. Solenoid $M^2$ when energized reinforces the pull of the spring. The governor consists of an arm G, having at one end a weight G' and pivoted at its other end $G^2$ to the inside face of one of the car-trucks. The arm is connected to a spring $S^2$, which normally holds its weighted end near the wheel center. When the wheel revolves, the centrifugal force tends to throw the weight G' outwardly or toward the wheel-rim against the action of the spring. On the wheel-face are four contact-plates C' $C^3$ $C^4$ $C^5$, with which the governor-arm may make electrical contact, as hereinafter described. The free end of the governor-arm also sweeps over a series of contact-points $Q^6$ to $Q^{12}$, between which are resistances $R^5$ to $R^{11}$. Electrically connected with the governor-arm contact plates and points are the insulated rings 1 2 3 4 of the car-axle. Against these rings bear brushes B' to $B^4$ The controller V has a pivoted arm W, a curved portion of which enters the core of a curved solenoid $M^4$. When said solenoid is energized, it draws in its core and so causes another arm F, connected to arm W, but insulated therefrom, to sweep over a contact-plate $C^2$. A volute spring $V^2$, connected at one end to arm F and at the other end to a fixed point, maintains the end of arm F at one extremity of contact-plate $C^2$ and also upon the first of a series of contact-points Q' to $Q^5$, between which contact-points are interposed resistances R' to $R^4$. Three circuit-breakers are provided, of the same general construction as those having the solenoid $M^{12}$. These solenoids are marked $M^3$, $M^5$, and $M^6$, and their object and operation will appear as the operation of the whole is developed.

*The operation of the apparatus.*—In order to avoid complication and to render the description clear, we now proceed to assume certain conditions of speed, &c., and to describe the operation of the various mechanisms in these circumstances.

I. The car is running at normal full speed on main line $L'$. This condition is illustrated diagrammatically in Fig. 6, in which for the sake of clearness the parts of the system not directly affected and acting are omitted. The relation of the weight $G'$ on governor-arm $G$ and the spring $S^2$, acting on said arm, is to be such that when a predetermined or normal speed of the car is attained said arm shall be thrown outwardly by the centrifugal force due to the rotation of its supporting-wheel and the end of said arm shall make contact with the contact-point $Q^9$, so cutting out of circuit the resistances $R^6$, $R^7$, and $R^8$. The "full-speed" current now passes from main line $L'$ to trolley $T'$, to brush $B'$, and ring 1, to and along a conductor on the governor-arm $G$, but insulated therefrom, to contact-plate $C'$, to ring 2, brush $B^2$, to controller contact-plate $C^2$, where the circuit divides. As indicated by the short arrows, part of the current then proceeds by controller-finger $F$ to contact-point $Q'$, and so to the motor $K$ and trolley $T^7$ to the return-rail $A^7$, and part through the resistances $R'$, $R^2$, and $R^5$ and solenoid $M'$ to said return-trolley $T^7$. The solenoid $M'$ then overpowers spring $S'$ and moves the brake-shoe $U$ away from the car-wheel.

II. The car attains an excessive speed or a speed greatly above that predetermined and normal. This condition is illustrated in Fig. 7, parts not affected being omitted, as before. By the increased action of the centrifugal force due to the rotation of the car-wheel the governor-arm $G$ is caused to move outwardly until it makes contact with the limiting contact-point $Q^{12}$ and with contact-plate $C^4$. Current now passes from line $L'$ and trolley $T'$ to brush $B'$, ring 1, to and along a conductor on governor-arm $G$, but insulated therefrom, to contact-plate $C^4$, to ring 4, brush $B^4$, resistance $R^{15}$, and solenoid $M^3$ to return-trolley $T^7$ and return-rail $A^7$. Solenoid $M^3$ being thus energized draws in its core, thus moving its associated pivoted circuit-closing lever $O^3$ to close contact at $N'$. Current may now pass from ring 1 to governor contact-plate $C^3$, governor-arm $G$, contact-point $Q^{12}$, ring 3, brush $B^3$, controller-solenoid $M^4$, and closed contact $N'$ to return. Solenoid $M^4$, acting on controller-finger $F$, moves that finger from contact-point $Q'$ to contact-point $Q^5$, as shown. $Q'$ is connected to one terminal of the motor $K$, the other terminal of said motor being connected to the return-trolley $T^7$. Therefore this movement of finger $F$ brings all of the controlling-resistances $R'$ $R^2$ $R^3$ $R^4$ into the motor-circuit. It will also be observed that while one terminal of the brake-solenoid $M'$ is connected to return the other terminal is connected to controller contact-point $Q^3$. Therefore the controller-resistances $R'$ $R^2$ and the additional resistance $R^{12}$ are also brought into the circuit of that solenoid. The intervention of these resistances into the circuits of both the motor and the solenoid $M'$ reduces the current in both circuits, while in addition full current is established from controller contact-point $Q^5$ through the solenoid $M^2$ to return. The strength of solenoid $M'$ being thus decreased the spring $S'$ and the opposing solenoid $M^2$ conjointly act to bring the brake-shoe $U$ against the wheel.

Let it now be assumed that, III, the car attains a speed above normal, but not so great as last considered. Still referring to Fig. 7, the governor-arm $G$ will move outward to a less extent and close contact with either contact-point $Q^{10}$ or $Q^{11}$. In such case either or both of the resistances interposed between said contact-plates would be brought into the circuit of controller-solenoid $M^4$, and the controller-finger $F$ would be moved from contact-point $Q'$ to a less extent than before, thus putting in a part of the controller-resistances $R'$ $R^2$, &c., and so cutting off current to the motor until the speed fell to the normal rate, when the governor-arm $G$ would once more return to $Q^9$.

Having now explained the conditions when the car is at rest and running over the road, we come to those under which the car is shunted off to a predetermined station. We now assume, IV, the car is running at normal speed and approaches its destined station. The turnout-switch is to be automatically closed and the speed of the car reduced, so that it may safely pass over the station-loop. This is illustrated in Fig. 8 and also in Fig. 9, which shows the switch-controlling mechanism in plan. The trolleys $T^2$ and $T^3$ on the car now make contact, respectively, with the station-line $L^2$ and switch-line $L^3$. As shown in Fig. 9, $L^2$ takes current directly from the main feeder-line $D$. $L^3$ is open at one end and connected at the other through the switch-solenoid $M^{11}$ to the return-rail $A^7$. From trolley $T^2$ current passes along a conductor on arm $P$ to solenoid $M^5$. As the main feeder-line $D$ is directly connected to station-line $L^2$, it follows that when trolley $T^2$ on arm $P$ meets that line $L^2$ then current proceeds to solenoid $M^5$ and thence to solenoid $M^3$, and so to return trolley $T^7$ and rail $A^7$. Solenoid $M^5$ controls through its moving core two circuit-breaking levers $O^4$ $O^3$, both of which are connected to the spring $S^3$, which normally tends to keep open their contact-places $N^2$ and $N^3$. Solenoid $M^3$, as already explained, controls contact $N'$. Now when trolley $T^2$ meets station-line $L^2$ current flows through solenoids $M^5$ and $M^3$, contact $N^2$ being thus closed. The current proceeds therefrom to the junction-point $H$, where it branches. Following one branch it then proceeds to the contact $N^3$, and so to trolley $T^3$, and thus gets on the switch-line $L^3$, which leads it through the switch-actuating solenoid $M^{11}$, Fig. 9, and so to return. The core of solenoid $M^{11}$ is directly connected to the movable switch-rail $A^3$ and also to a spring $S^4$, which normally acts to keep the switch open; but when the solenoid $M^{11}$ is energized, as above described, then it acts to move the switch-rail $A^3$ against the pull of the spring $S^4$ and so to close the switch; and, furthermore, as the trolleys $T^2$ and $T^3$ both meet their lines $L^2$ and $L^3$ considerably in advance of the switch the latter becomes of course set before the car reaches it. Returning now to junction-point H, following the other branch of the circuit, and remembering that with the car running at normal speed the governor-arm would be on contact-point $Q^9$, as indicated by the dotted line on Fig. 8, circuit passes to brush $B'$, ring 1, resistance $R^9$, contact $Q^9$, (contacts $Q^{10}$, $Q^{11}$, and $Q^{12}$ are omitted in this figure,) and thence by governor-arm G to contact-plate $C^5$, to ring 3, brush $B^3$, controller-solenoid $M^4$, contact $N'$, and so to return. Solenoid $M^4$ now being energized would move the controller-finger F momentarily over to contact-point $Q^5$, (see also Fig. 10,) and the effect of this, which has already been described in detail in the preceding paragraph II,(the car attains excessive speed, &c.,) is that the motor-current is reduced and brake applied.

We now proceed to describe how, V, the car is brought to reduced speed and runs upon the station-loop. As the speed has fallen the governor-arm G has gradually swung inward to its "slow-running" position, in which it is shown in Fig. 8—that is, in contact with contact-point $Q^6$—cutting in the resistances $R^8$, $R^7$, and $R^6$, and so gradually reducing the current in the controller-solenoid $M^4$. The finger F is then slowly carried back by its volute spring from $Q^5$ over the resistances $R^4 R^3 R^2 R'$ to $Q^2$, reducing the strength of the braking-solenoid $M^2$ and increasing that of the brake-release solenoid $M'$ and the flow of current through the motor. When the car attains its predetermined slow-running speed, the controller-finger F is in contact with contact-point $Q^2$, the resistance $R'$ being so adjusted as to send a current of such strength from $R^2$ to motor as to produce the slow speed of the car. This current passing through solenoid $M'$ also holds off the brake. The car traveling at this slow speed clears the switch and then trolley $T^3$ runs off the end of switch-line $L^3$. (See Fig. 4.) Solenoid $M^{11}$ then becoming dead its spring $S^4$ opens the switch. The car then runs into the station on the current from station-line $L^2$ at slow speed, and since $L^2$ stops a little before the car reaches the station (see Fig. 4) as the car leaves it all current will cease to flow to motor and brake solenoids, so that the brake-spring $S'$ will apply the brake and bring the car to rest, as shown in Fig. 5. The car having been unloaded may be refilled and directed to any station on the line or the main depot by adjusting the arm P to suitable position. The attendant starts it on its journey by pushing it by hand until it reaches the inclined portion of the loop, down which it passes by gravity until it reaches the track, along which it travels, as already described. It has of course been assumed in the foregoing that the track-switch whereby the car has been shunted to the station-loop has worked properly.

We now assume, VI, the switch has failed properly to close, or the car having passed upon the loop has failed properly to open. These contingencies are guarded against in the following manner: Referring to Fig. 9, secured to the movable core of solenoid $M^{11}$ is a finger $F^3$, which as said core moves in and out of the solenoid passes over and makes contact with a fixed contact-plate $C^6$. The width of this plate is such that the finger $F^3$ runs off of it at one side or the other only when the switch is fully closed or fully open. The finger $F^3$ is connected by a flexible connection with the main feeder-line D, so that when said finger is in contact with the plate $C^6$ current may pass from said feeder to the finger end and so to the plate, and thence to the safety-line $L^4$ connected to said plate. From line $L^4$ current proceeds to trolley $T^4$, and thence to a solenoid $M^6$ on the car. As shown in Fig. 10, the core of this solenoid has a retracting-spring $S^5$ and actuates a pivoted circuit-closing lever $O^6$ to make and break contact at $N^4$, and also another circuit-closing lever $O^5$, which on one side makes or breaks a double contact at $N^5$ and on the other side a single contact. The arrangement of levers $O^5$ and $O^6$ is such that when solenoid $M^6$ is energized the double contact at $N^5$ and the contact at $N^4$ are closed simultaneously. The current now proceeds as follows: After passing through solenoid $M^6$ it goes to return. When contact $N^4$ is closed, it bifurcates, part flowing through resistance $R^{18}$ to solenoid $M^3$ to return, thus closing contact at $N'$, and part passing through a shunt between solenoid $M^6$ and a resistance $R^{13}$ to the double contact $N^5$, both to controller-solenoid $M^4$ and contact-plate $C^2$. Solenoid $M^4$ then carries finger F over to contact $Q^5$, cutting resistances into the motor-circuit and that of brake-release solenoid $M'$ and out of the circuit of brake-solenoid $M^2$. Current is thus cut off from the motor and brake-release solenoid $M'$, and the brake is heavily applied by solenoid $M^2$, which is energized by the current flowing through contact $N^5$, plate $C^2$, controller-finger F, contact-point $Q^5$, resistance $R^{17}$, and solenoid $M^2$ to return. The car therefore stops almost immediately. As soon as the switch is properly opened or closed the contact-finger $F^3$ runs off of contact-plate $C^6$ on one side or the other, thus breaking circuit from the main feeder to trolley $T^4$. Solenoids $M^6$ and $M^3$ then permit their associated springs to open the contacts $N^4$ and $N^5$, whereupon the controller-solenoid $M^4$ allows finger F to return to the position it occupied immediately prior to the stoppage of the car, the brake is released, trolley connection to motor is restored, and the car resumes its travel. If the car continues its journey on the main line, as shown in Fig. 6, contact at N' will be opened; but if after passing on the loop the switch closes imperfectly behind it still the trolley $T^2$ will continue in contact with station $L^2$, and therefore the car in the loop will be permitted to continue its travel to the station, although a following car on the main line will be stopped.

We now assume, VII, the car being ready to start on its return journey, another car running on the track upon which it is about to enter gets in the way. Referring now to Fig. 11, in which E represents the car on the loop, moving as indicated by the arrow adjoining it, and E' represents another car on the main track, also moving as the arrow next to it indicates, obviously there is danger of E running into E'. This, however, is prevented by delaying car E, while allowing car E' to go on. It has already been shown in paragraph VI how a current proceeding from line $L^4$ to trolley $T^4$ stops the car. In the station-loop is provided a short section of line $L^{4a}$, which is connected to main feeder D through a contact $N^9$, governed by finger $F^5$, which is controlled by solenoid $M^{13}$. One terminal of $M^{13}$ is connected to the feeder D and the other to the breaker-line $L^6$. Normally, the solenoid $M^{13}$ not being energized, contact $N^9$ is broken by the retracting-spring $S^6$. If, however, a car E' takes position on the line-block in front of car E, then circuit is established from feeder D through solenoid $M^{13}$ to breaker-line $L^6$ and through the car connections to return-trolley $T^7$ and return-line $A^7$. Solenoid $M^{13}$ then closes contact $N^9$, current passes from feeder D to trolley $T^4$ of car E, and car E stops until car E' clears the block.

VIII. The car being ready to start on its return journey, another car running on the track upon which it is about to enter is liable to overtake it, Fig. 12. Here E is the car coming upon the track from the loop and $E^2$ is the overtaking car. It is necessary to delay $E^2$ and allow E to go on. The trolley T' of $E^2$ is running on the main line L', current passing to it from main feeder D by contact $N^8$, as already described. In the circuit from $N^8$ to main line L' is interposed a circuit-closing finger $F^6$, normally caused by its retracting-spring $S^7$ to close the contact $N^{10}$. Said finger is controlled by solenoid $M^{14}$, one terminal of which is connected to main feeder D and the other to a short line $L^{6a}$ in the station-loop. Assuming now that the car $E^2$ is running on its track, contact $N^{10}$ being closed, the arrival of car E upon the short line $L^{6a}$ closes circuit from $L^{6a}$ through car-trolley $T^6$ to trolley $T^7$ and return-rail $A^7$. Solenoid $M^{14}$ being energized opens contact $N^{10}$, breaking circuit from feeder D to trolley T' of car $E^2$, and accordingly car $E^2$ stops while car E proceeds.

We now assume, IX, a car having started from the main or central station, for example, it is desired to bring it back. This is illustrated in Figs. 13 and 14. In Fig. 13, Z represents the main station, at which on the down side of the loop is arranged a return siding, (indicated by dotted lines $A^8$.) Between the tracks of this siding is provided a reversing-line $L^8$, connected to a circuit-closer $O^7$, which is normally retracted by a spring $S^8$, so as to break circuit from main feeder D to line $L^8$, but which establishes circuit when manually closed. The reversing device on the car is represented in Fig. 14. Solenoid $M^{15}$ being supported on the car in any suitable way controls the ordinary reversing-switch $O^8$, which switch is placed in the motor-circuit between trolley T' and return-trolley $T^7$. When trolley $T^8$ on the car runs upon reversing-line $L^8$, then current is established through the solenoid $M^{15}$ to return-trolley $T^7$, and the direction of current in the motor may be reversed by closing circuit-breaker $O^7$. The car is supposed to proceed from Z on the station-loop in the direction of the arrows $f$. When it gets on the main line, the operator at Z closes circuit from feeder D to reversing-line $L^8$, the motion of the car is reversed, and it returns to the station on the siding $A^8$ in the direction of arrow $g$. The loop at Z' is intended to show that cars can be transferred from up to down track by ordinary sidings and loops arranged as indicated, the crossover part of the loops being above the main tracks. The reversing-line $L^8$ is here shown as located only in a return shunt; but of course it can be laid along the entire road or any section of it and operated by manual control, as already described.

X. *The running-indicators $X X^2$.*—The object of these devices is to show variations in speed of car and also the side of the station on which a car is running. One indicator is provided for each track. The indicators receive current of variable strength corresponding to speed of car from the indicator-line $L^5$.

Referring to Fig. 6, when the car increases in speed the governor-arm G moves outward centrifugally, cutting out resistances and finally allowing a full-speed current to flow from trolley T'' to ring 1, resistance $R^9$, ring 3, brush $B^3$ to trolley $T^5$, and so to the signaling-line $L^5$. The strength of current reaching line $L^5$ will therefore obviously depend upon the speed of the car and will vary accordingly.

Referring now to Fig. 5, the indicator X, located at a station, is interposed in signaling-line $L^5$, between the parts of which it is connected by wire $h^3$ to the return-rail $A^7$. It has a pivoted index I, weighted at its end $I^2$ and provided at its opposite end with a curved plate $I^3$, which plate when the index swings on its pivot moves in inductive proximity to the correspondingly-curved face of the fixed core of electromagnet $M^{10}$, which core carries two coils. The index I is mechanically connected to the movable cores of opposing solenoids $M^9$ and $M^{16}$. One terminal of solenoid $M^9$ is connected to a pivoted arm which is retracted by spring $S^9$ to normally hold open the contact $N^6$, and said arm is connected to the core of solenoid $M^7$. The other terminal of solenoid $M^9$ is connected through resistance $R^{14}$ to a contact-plate $C^8$. The terminals of the opposing solenoid $M^{16}$ are similarly arranged, one being connected to a spring-retracted arm controlled by solenoid $M^{18}$ and governing a contact $N^{18}$ and the other through resistance $R^{16}$ to contact-plate $C^9$. The fixed contacts at $N^6$ and $N^{18}$ are electrically connected by wire $h$ to the main feeder D. The indicator is placed vertically and has a pendulum Y, which in swinging to one side or the other establishes contact with plate $C^9$ or $C^8$. The pendulum-arm is secured to both movable cores of the opposing solenoids $M^8$ and $M^{17}$ and is connected by wire $h^3$ to the return-rail $A^7$. The remaining circuits in the indicator are as follows: On one side of the apparatus from solenoid $M^7$ to solenoid $M^8$ the circuit here branches. One branch proceeds through solenoid $M^8$ to wire $h^3$. The other branch proceeds through one coil of solenoid $M^{10}$ to wire $h^3$; on the other side of the apparatus in similar manner from solenoid $M^{18}$ to solenoid $M^{17}$. The circuit here branches. One branch proceeds through solenoid $M^{17}$ to wire $h^3$. The other branch proceeds through the other coil of solenoid $M^{10}$ to wire $h^3$. When the car is at rest, as shown in Fig. 5, the trolley $T^5$ being off of line $L^5$, no current passes to the indicator. The parts of the apparatus then assume the positions represented in said figure—that is to say, the index-arm I is caused by its weighted end $I^2$ to fall into the position shown at the extreme right of its path, thus showing that the car is on the right-hand side of the station. The pendulum Y hangs perpendicularly, not in contact with either plate $C^8$ or $C^9$.

Referring now to Fig. 6, we here show the mechanism on the right-hand side of the indicator, which comes into operation when the car is running on the right-hand side of the station. The corresponding mechanism on the left-hand side of the indicator is omitted for the sake of clearness. Current proceeds from car-trolley $T^5$ to line $L^5$, to solenoid $M^7$, which closes contact $N^6$, thus allowing the current from main feeder D to proceed by wire $h$ through contact $N^6$ to solenoid $M^9$. A part of this current energizes solenoid $M^8$, which carries pendulum Y into contact with plate $C^8$, thus completing circuit from solenoid $M^{10}$ to wire $h^3$ and return. The index-arm I is now acted on by both solenoids $M^{10}$ and $M^9$, the first tending to bring it vertical, the second to deflect it to the right. As a result it assumes an inclined position, as indicated, when full current is actuating the car, and hence when the car is at normal full speed. If, however, the speed should fall off, then the strength of solenoid $M^{10}$ would be correspondingly weakened and the solenoid $M^9$ would pull the index-arm still farther to the right. Hence the side toward which the index-arm is deflected shows on what side of the station the car is running, and the angle of deflection shows the speed of the car. If the car instead of being on the right-hand side of the station were on the left-hand side, then the devices on the left-hand side of the indicator would operate in like manner and the index-arm I would swing more or less to the left instead of to the right.

In Fig. 4 the indicator X belongs to the up-track and $X^2$ to the down-track. Indicator X is connected to the up-track signaling-line $L^5$ by the wires $d\ d$, to return-rail $A^7$ by wire $h^3$, and to main feeder D by wire $h$. Indicator $X^2$ is connected to down-track signaling-line $L^5$ by the wires $d'\ d'$, to return by wire $h^2$, and to the main feeder by branch $h^4$.

XI. *Arrangement of tracks and loops.*—This is illustrated in Figs. 15 to 20, inclusive, in which, as before, A $A^2$ are the main tracks. The loops $A^9$, $A^{10}$, $A^{11}$, $A^{12}$, and $A^{13}$ are disposed at intervals along the main tracks and extend from one main track to the other. The car E, Fig. 20, is shown on main track A just about to pass upon the loop $A^9$ and in various successive positions upon the remaining loops $A^{10}$ to $A^{12}$ until at $A^{13}$ it has passed upon the return-track $A^2$. The stopping mechanism for the car when upon the loop, which has already been fully described, may be arranged to arrest the motion of the car at any convenient place on said loop where a station may be located. Thus such a position may be that of the car E on the loop $A^{11}$, Fig. 20. The loops $A^9$ $A^{10}$, &c., being in a different plane from that of the main tracks, may rise above said main tracks, as represented in Figs. 15 and 18, or descend below the main tracks, as represented in Figs. 16 and 19. In the case of Fig. 15 the car will first ascend the incline of the loop and then pass upon a straight portion thereof. (Represented at $A^{14}$, Fig. 15.) Upon being started upon its return journey it will descend the incline $A^{15}$, and so pass upon the return-track $A^2$. Where the loop descends below the level of the main track, the car will first descend an inclined portion of said loop and then pass upon a level portion, as indicated at $A^{16}$, then ascend the inclined portion $A^{17}$ to pass upon the return-track $A^2$. In Figs. 15, 16, 17, 18, and 19 the car on the level portion $A^{14}$ or $A^{16}$ of the loop is represented at $E^2$, and cars running on the return-track $A^2$ are represented at $E^3$ and $E^4$.

We claim—

1. In an electric railway, a track, a plurality of sidings, a car adapted to travel on said track and sidings, a switch between said track and each of said sidings, an electromagnetic device associated with said switch for operating the same, a fixed circuit-terminal in proximity to each switch, and a pivoted circuit-closing arm carried by said car; the said circuit-terminals being disposed in different positions on an arc struck from the pivot center of said arm, and the said arm being adjustable to make contact with any one of said terminals and thereby to establish circuit from said terminal to the electromagnetic device operating the switch at the siding in proximity to said terminal.

2. In an electric railway, a track, a plurality of fixed circuit-terminals in proximity thereto, a car adapted to travel on said track and a circuit-closer on said car adjustable to make contact with and so close circuit through any one of said terminals to electrically-operated mechanism on said car.

3. In an electric railway, a track, a plurality of line conductors communicating with a source of current, disposed along said track in proximity thereto, a car adapted to travel on said track and a circuit-closer on said car adjustable to make contact with and so close circuit through any one of said conductors to electrically-operated mechanism on said car.

4. In an electric railway, a track, a plurality of fixed circuit-terminals in proximity thereto, a car, a motor actuating said car, a device for regulating the strength of current actuating said motor, a circuit-closer on said car adjustable to close circuit through any one of said terminals and said regulating device and thereby automatically to modify the speed of said car.

5. In an electric railway, two main tracks, a loop-track extending from one main track to the other and in a different plane from said tracks, a car adapted to travel on said tracks and means for diverting said car from one of said main tracks to said loop-track.

6. In an electric railway, two main tracks, a loop-track extending from one main track to the other in an upwardly and downwardly directed curve, and means for diverting said car from one of said main tracks to said loop-track.

7. In an electric railway, two main tracks, a loop-track extending from one main track to the other and in a different plane from said tracks, a car adapted to travel on said tracks, means for automatically diverting said car from one of said main tracks to said loop-track, and means for automatically stopping said car on said loop.

8. In an electric railway, a main track, a branch track, a car adapted to travel on said tracks, and means for automatically reducing the speed of said car prior to its passage from said main track to said branch track, and vice versa.

9. In an electric railway, a track, a siding, a car adapted to travel on said track and siding, a switch between said track and siding, an electromagnetic device for actuating said switch, electrically-actuated brake mechanism on said car, a fixed line conductor in proximity to said switch and communicating with a source of current-supply and a circuit-closing device on said car constructed and arranged to establish circuit from said line conductor to said brake-actuating mechanism and said switch-actuating mechanism whereby said mechanisms are operated.

10. In an electric railway, a track, a siding, a car adapted to travel on said track and siding, a switch between said track and siding, an electromagnetic device for actuating said switch, a fixed line conductor in proximity to said switch and communicating with a source of current-supply, and, on said car, a driving-motor, means for regulating the strength of current passing thereto, a brake-actuating mechanism and a circuit-closing device being constructed and arranged to establish circuit from said line conductor to said brake-actuating mechanism, and a motor-current regulator, whereby said brake mechanism is operated and said motor-current regulated.

11. In an electric railway, a track, a siding, a car adapted to travel on said track and siding, a switch between said track and siding, and, on said car, means for electrically controlling said switch and means for arresting the movement of said car upon the failure of said controlling means to close said switch.

12. In an electric railway, a track, a siding, a car adapted to travel on said track and siding, a switch between said track and siding, means for holding said switch normally in open position, and, on said car, means for electrically controlling said switch to close the same and means for arresting said car when said switch is neither fully open nor fully closed.

13. In an electric railway, two main tracks, a loop-track connecting said main tracks, cars adapted to travel on said tracks, means for automatically diverting a car from one of said main tracks to said loop-track and means for preventing collision of said car upon its passage from said loop to the other main track, with cars on said last-named track.

14. In an electric railway, two main tracks, a loop-track connecting said main tracks, cars adapted to travel on said tracks, means for automatically diverting a car from one of said main tracks to said loop-track, and means controlled by said car for arresting the motion of a car on the other main track, and thereby preventing collision between said loop-car and said main-track car, upon the passage of said loop-car from said loop to said main track.

15. In an electric railway, two main tracks, a loop-track connecting said main tracks, cars adapted to travel on said tracks, means for automatically diverting a car from one of said main tracks to said loop-track and means controlled by a car on the other main track for arresting the motion of said loop-car and thereby preventing collision between said loop-car and said main-track car, upon the passage of said loop-car from said loop to said main track.

16. In an electric railway, two main tracks, a plurality of loop-tracks curved in the same direction and connecting said main tracks, a car, and means for automatically diverting said car from one of said main tracks to any predetermined loop-track.

17. In an electric railway, two main tracks, a plurality of loop-tracks connecting said main tracks, a station on each loop-track, a car, means for automatically diverting said car from one of said main tracks to any predetermined loop-track, and means for automatically stopping said car at the station on said predetermined loop.

18. In an electric railway, a car, two main tracks, a loop-track connecting said main tracks and extending upwardly from and over said main tracks, and means for automatically diverting said car from one of said main tracks to said loop.

19. A telpherage system, comprising a main track, side tracks, switches for controlling connection between said main track and said side tracks, movable cars provided with means for operating a predetermined track-switch without affecting other track-switches, and also provided with electric brakes, and means for automatically applying said brakes for overcoming the inertia of said cars.

20. In an electric railway, a car, two main tracks a loop-track connecting said main tracks having a level portion located in a different plane from that of the main tracks, means for automatically diverting said car from one of said main tracks to said loop-track and means for automatically arresting said car upon said level portion of said loop.

21. In an electric railway, two main tracks, a loop-track connecting said main tracks, a car adapted to travel on said tracks, means for automatically diverting said car from one of said main tracks to said loop-track, and means for electrically impelling said car over a predetermined length of said loop-track.

THOMAS E. MURRAY.
JOHN VAN VLECK.

Witnesses:
   JOS. WILLIAMS,
   A. A. REGENS.